(12) United States Patent
Kovach (10) Patent No.: US 11,602,092 B2
(45) Date of Patent: Mar. 14, 2023

(54) FRAME CONTROL SYSTEM FOR AN AGRICULTURAL IMPLEMENT

(71) Applicant: CNH Industrial America LLC, New Holland, PA (US)

(72) Inventor: Michael George Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 427 days.

(21) Appl. No.: 16/830,410

(22) Filed: Mar. 26, 2020

(65) Prior Publication Data

US 2021/0298217 A1 Sep. 30, 2021

(51) Int. Cl.
*G08B 21/00* (2006.01)
*A01B 63/00* (2006.01)
(Continued)

(52) U.S. Cl.
CPC .......... *A01B 63/008* (2013.01); *A01B 49/027* (2013.01); *A01B 63/32* (2013.01);
(Continued)

(58) Field of Classification Search
CPC ..... A01B 63/008; A01B 49/027; A01B 63/32; A01B 79/005; A01B 63/1112;
(Continued)

(56) References Cited

U.S. PATENT DOCUMENTS 3,642,087 A 2/1972 Sampey
4,413,685 A 11/1983 Gremelspacher et al.
(Continued)

FOREIGN PATENT DOCUMENTS

CN 105783839 7/2016
CN 109588075 4/2019
(Continued)

OTHER PUBLICATIONS

EP Application No. 21165028.8 Extended Search Report, dated Dec. 10, 2021, 13 pgs.
(Continued)

*Primary Examiner* — Mark S Rushing
(74) *Attorney, Agent, or Firm* — Rebecca Henkel; Rickard DeMille (57) ABSTRACT

A frame control system for an agricultural implement includes a first sensor configured to be coupled to a sub-frame of the agricultural implement and directed toward a soil surface. The first sensor is configured to emit a first output signal toward the soil surface and to receive a first return signal indicative of a first height of the sub-frame above the soil surface. The frame control system also includes a first sub-frame actuator configured to be coupled to the sub-frame and to a main frame of the agricultural implement. The first sub-frame actuator is configured to control a first position of the sub-frame relative to the main frame along a vertical axis. In addition, the frame control system includes a controller configured to control the first sub-frame actuator such that a difference between the first height and a target height is less than a threshold value.

12 Claims, 3 Drawing Sheets

(51) Int. Cl.
*A01B 49/02* (2006.01)
*A01B 63/32* (2006.01)
*A01B 79/00* (2006.01)
*G01B 7/02* (2006.01)
*G01S 13/08* (2006.01)
*G01S 15/08* (2006.01)
*G01S 17/08* (2006.01)

(52) U.S. Cl.
CPC ............ *A01B 79/005* (2013.01); *G01B 7/023* (2013.01); *G01S 13/08* (2013.01); *G01S 15/08* (2013.01); *G01S 17/08* (2013.01)

(58) Field of Classification Search
CPC ....... A01B 63/111; G01B 7/023; G01S 13/08; G01S 15/08; G01S 17/08
USPC .......................................................... 172/4
See application file for complete search history.

(56) References Cited

U.S. PATENT DOCUMENTS

| | | | |
|---|---|---|---|
| 4,491,183 A | 1/1985 | Anderson et al. | |
| 4,679,633 A | 7/1987 | Kauss | |
| 4,775,940 A | 10/1988 | Nishida et al. | |
| 4,776,153 A | 10/1988 | DePauw et al. | |
| 5,060,205 A | 10/1991 | Phelan | |
| 5,430,651 A | 7/1995 | Nielsen et al. | |
| 5,488,817 A | 2/1996 | Paquet et al. | |
| 5,535,577 A | 7/1996 | Chmielewski et al. | |
| 5,621,666 A | 4/1997 | O'Neail et al. | |
| 5,711,139 A | 1/1998 | Swanson | |
| 5,794,421 A | 8/1998 | Maichle | |
| 6,076,611 A | 6/2000 | Rozendaal et al. | |
| 6,089,327 A | 7/2000 | Kimura et al. | |
| 6,131,919 A | 10/2000 | Lee et al. | |
| 6,164,385 A | 12/2000 | Buchi | |
| 6,216,794 B1 | 4/2001 | Buchi | |
| 6,222,628 B1 | 4/2001 | Gorallo et al. | |
| 6,305,478 B1 | 10/2001 | Friggstad | |
| 6,588,187 B2 | 7/2003 | Engiestad et al. | |
| 6,698,524 B2 | 3/2004 | Bernhardt et al. | |
| 6,813,873 B2 | 11/2004 | Allwörden et al. | |
| 6,990,390 B2 | 1/2006 | Groth et al. | |
| 7,028,554 B2 | 4/2006 | Adamchuk et al. | |
| 7,063,167 B1 | 6/2006 | Staszak et al. | |
| 7,540,129 B2 | 6/2009 | Kormann | |
| 7,540,130 B2 | 6/2009 | Coers et al. | |
| 7,748,264 B2 | 7/2010 | Prem | |
| 7,866,671 B2 | 1/2011 | Madler | |
| 7,870,709 B2 | 1/2011 | Digman | |
| 8,573,319 B1 | 11/2013 | Casper et al. | |
| 8,720,170 B2 | 5/2014 | Deneault et al. | |
| 8,751,147 B2 | 6/2014 | Colwell | |
| 8,752,642 B2 | 6/2014 | Whalen et al. | |
| 8,827,001 B2 | 9/2014 | Wendte et al. | |
| 8,843,283 B2 | 9/2014 | Strelioff et al. | |
| 8,857,530 B2 | 10/2014 | Henry | |
| RE45,303 E | 12/2014 | Henry et al. | |
| 8,977,441 B2 | 3/2015 | Grimes et al. | |
| 9,026,321 B2 | 5/2015 | Henry et al. | |
| 9,301,439 B2 | 4/2016 | Gilstring | |
| 9,351,443 B2 | 5/2016 | Miller et al. | |
| 9,405,039 B2 | 8/2016 | Anderson | |
| 9,481,294 B2 | 11/2016 | Sauder et al. | |
| 9,510,498 B2 | 12/2016 | Tuttle et al. | |
| 9,516,802 B2 | 12/2016 | Zemenchik | |
| 9,554,098 B2 | 1/2017 | Casper et al. | |
| 9,554,504 B2 | 1/2017 | Houck | |
| 9,585,298 B2 | 3/2017 | Henry et al. | |
| 9,585,307 B2 | 3/2017 | Holland | |
| 9,693,496 B2 | 7/2017 | Tevs et al. | |
| 9,706,696 B2 | 7/2017 | Gschwendtner | |
| 9,750,174 B2 | 9/2017 | Sauder et al. | |
| 9,801,329 B2 | 10/2017 | Zielke | |
| 9,861,022 B2 | 1/2018 | Bassett | |
| 9,980,422 B2 | 5/2018 | Czapka et al. | |
| 10,045,474 B2 | 8/2018 | Bachman et al. | |
| 10,104,822 B2 | 10/2018 | Couchman | |
| 10,123,475 B2 | 11/2018 | Posselius et al. | |
| 10,178,823 B2 | 1/2019 | Kovach et al. | |
| 10,219,421 B2 | 3/2019 | Achen et al. | |
| 10,820,476 B2 | 11/2020 | Stoller et al. | |
| 2010/0017075 A1 | 1/2010 | Beajuot | |
| 2012/0227992 A1 | 9/2012 | Henry | |
| 2013/0068489 A1 | 3/2013 | Blunier et al. | |
| 2014/0060862 A1* | 3/2014 | Gilstring | A01B 63/114 172/4 |
| 2015/0053439 A1* | 2/2015 | Ohnsat | A01B 21/08 172/569 |
| 2016/0029547 A1 | 2/2016 | Casper et al. | |
| 2017/0064900 A1 | 3/2017 | Zemenchik | |
| 2017/0105331 A1 | 4/2017 | Herlitzius et al. | |
| 2017/0251587 A1* | 9/2017 | Sporrer | A01B 15/14 |
| 2018/0114305 A1 | 4/2018 | Strnad et al. | |
| 2018/0153088 A1* | 6/2018 | Sporrer | A01B 63/008 |
| 2018/0220577 A1 | 8/2018 | Posselius et al. | |
| 2018/0279543 A1 | 10/2018 | Kovach | |
| 2018/0299422 A1 | 10/2018 | Pregesbauer | |
| 2018/0303022 A1 | 10/2018 | Barrick et al. | |
| 2018/0310465 A1 | 11/2018 | Peterson et al. | |
| 2018/0310466 A1 | 11/2018 | Kovach et al. | |
| 2018/0340845 A1 | 11/2018 | Rhodes et al. | |
| 2019/0008088 A1 | 1/2019 | Posselius et al. | |
| 2019/0059198 A1 | 2/2019 | Schnaider et al. | |
| 2019/0235529 A1* | 8/2019 | Barrick | A01B 63/14 |
| 2019/0246548 A1 | 8/2019 | Kovach et al. | |
| 2020/0000005 A1 | 1/2020 | Stanhope et al. | |
| 2020/0060062 A1 | 2/2020 | Sporrer et al. | |
| 2020/0084954 A1 | 3/2020 | Sporrer et al. | |
| 2020/0093052 A1 | 3/2020 | Preimess et al. | |
| 2020/0100419 A1 | 4/2020 | Stanhope | |
| 2020/0337206 A1 | 10/2020 | Hertzog et al. | |
| 2021/0045280 A1 | 2/2021 | Ehlert et al. | |
| 2021/0092892 A1 | 4/2021 | Pregesbauer | |

FOREIGN PATENT DOCUMENTS

| | | |
|---|---|---|
| EP | 1273216 | 1/2003 |
| EP | 3305052 | 4/2018 |
| JP | H02167004 | 6/1990 |
| JP | 2969808 | 11/1999 |
| JP | H11321634 | 11/1999 |
| JP | 2002165510 | 6/2002 |
| JP | 2005095045 | 4/2005 |
| WO | 2017158006 | 9/2017 |
| WO | WO2017197274 | 11/2017 |
| WO | WO2018018050 | 1/2018 |
| WO | 2019158454 | 8/2019 |

OTHER PUBLICATIONS

Gilliot et al., "Soil Surface Roughness Measurement: A New Fully Automatic Photogrammetric Approach Applied to Agricultural Bare Fields," Computers and Electronics in Agriculture, Jan. 23, 2017, pp. 63-78, Elsevier, https://www.researchgate.net/publication/312651105_Soil_surface_roughness_measurement_A_new_fully_automatic_photogrammetric_approach_applied_to_agricultural_bare_fields.

Hart-Carter Co., "Automatic Header Adjustment," Farm Show Magazine, 1984, p. 33, vol. #8, Issue #6.

Raper et al., "A Portable Tillage Profiler for Measuring Subsoiling Disruption," American Society of Agricultural Engineers, 2004, pp. 23-27, vol. 47(1), https://www.ars.usda.gov/ARSUserFiles/60100500/csr/ResearchPubs/raper/raper_04a.pdf.

Yasin et al., "Non-Contact System for Measuring Tillage Depth," Computers and Electronics in Agriculture, 1992, pp. 133-147, https://www.researchgate.net/publication/229318888_Non-contact_system_for_measuring_tillage_depth.

Peteinatos et al., "Precision Harrowing With a Flexible Tine Harrow and an Ultrasonic Sensor," Jul. 2015, Precision Agricultural, pp.

(56) References Cited

OTHER PUBLICATIONS 579-586, https://www.researchgate.net/publication/281437517_Precision_harrowing_with_a_lexible_tine_harrow_and_an_ultrasonic_sensor.
"Tiger-Mate® 255 Field Cultivator," 2017, Case IH Agriculture, 24 pgs.
"Ecolo-Tiger® 875 Disk Ripper," 2018, Case IH Agriculture, 16 pgs.
U.S. Appl. No. 16/830,531, filed Mar. 26, 2020, Michael George Kovach.
U.S. Appl. No. 16/830,331, filed Mar. 26, 2020, Michael George Kovach.
U.S. Appl. No. 16/830,335, filed Mar. 26, 2020, Michael George Kovach.
U.S. Appl. No. 16/830,344, filed Mar. 26, 2020, Michael George Kovach.
U.S. Appl. No. 16/830,373, filed Mar. 26, 2020, Michael George Kovach.
EP Application No. 21165022.1, Search Report dated Aug. 6, 2021, 8 pgs.
EP Application No. 21165029.6, Search Report dated Aug. 6, 2021, 7 pgs.
EP Application No. 21165028.8, Search Report dated Aug. 9, 2021, 14 pgs.
EP Application No. 21165025.4, Search Report dated Aug. 6, 2021, 9 pgs.
EP Application No. 19171136.5 Extended European Search Report dated Nov. 6, 2019, 22 pgs.

\* cited by examiner

FRAME CONTROL SYSTEM FOR AN AGRICULTURAL IMPLEMENT

BACKGROUND

The present disclosure relates generally to a frame control system for an agricultural implement.

Certain agricultural implements include ground engaging tools configured to interact with the soil. For example, a tillage implement may include tillage points and/or disc blades configured to break up the soil for subsequent planting or seeding operations. Certain tillage implements include a depth adjustment mechanism configured to control a penetration depth of the ground engaging tools into the soil. For example, an agricultural implement may include a first turnbuckle extending between a hitch assembly and a main frame of the tillage implement. The first turnbuckle may be adjusted to set the height of the main frame relative to the surface of the soil, thereby setting the penetration depth of first ground engaging tools, which are coupled to the main frame, to a first target penetration depth. In addition, the agricultural implement may include a second turnbuckle extending between the main frame and a sub-frame. The second turnbuckle may be adjusted to set the height of the sub-frame relative to the surface of the soil, thereby setting the penetration depth of second ground engaging tools, which are coupled to the sub-frame, to a second target depth. However, during operation, the height of certain portion(s) of the main frame and/or the sub-frame above the soil surface may vary due to variations in the soil surface. As a result, the penetration depth of ground engaging tools positioned at the portion(s) of the main frame/sub-frame may vary significantly from the first/second target penetration depth. Therefore, the effectiveness of the tillage operation may be substantially reduced.

BRIEF DESCRIPTION

In certain embodiments, a frame control system for an agricultural implement includes a first sensor configured to be coupled to a sub-frame of the agricultural implement and directed toward a soil surface. The first sensor is configured to emit a first output signal toward the soil surface and to receive a first return signal indicative of a first height of the sub-frame above the soil surface. The frame control system also includes a first sub-frame actuator configured to be coupled to the sub-frame and to a main frame of the agricultural implement. The first sub-frame actuator is configured to control a first position of the sub-frame relative to the main frame along a vertical axis. In addition, the frame control system includes a controller comprising a memory and a processor. The controller is communicatively coupled to the first sensor and to the first sub-frame actuator, and the controller is configured to control the first sub-frame actuator such that a difference between the first height and a target height is less than a threshold value.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
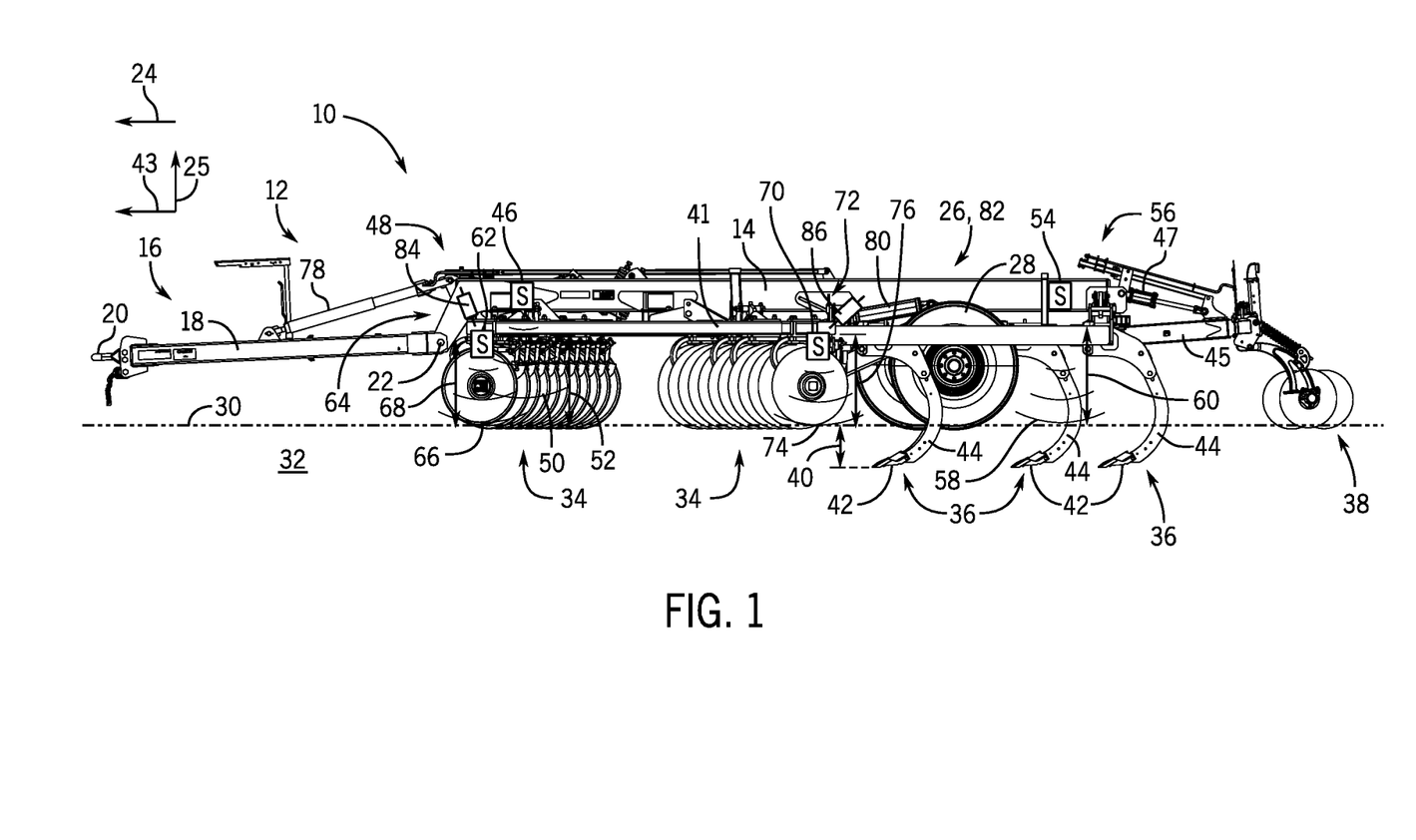
FIG. 1 is a side view of an embodiment of an agricultural implement having an embodiment of a frame control system.

FIG. 1 is a side view of an embodiment of an agricultural implement 10 having a frame control system 12. In the illustrated embodiment, the agricultural implement 10 is a primary tillage implement having multiple ground engaging tools configured to till soil. As illustrated, the agricultural implement 10 includes a main frame 14 and a hitch assembly 16 coupled to the main frame 14. The main frame 14 is substantially rigid (e.g., does not include any translatable and/or rotatable components) and formed from multiple frame elements (e.g., rails, tubes, braces, etc.) coupled to one another (e.g., via welded connection(s), via fastener(s), etc.). The hitch assembly 16 includes a hitch frame 18 and a hitch 20. The hitch frame 18 is pivotally coupled to the main frame 14 via pivot joint(s) 22, and the hitch 20 is configured to couple to a corresponding hitch of a work vehicle (e.g., tractor), which is configured to tow the agricultural implement 10 through a field along a direction of travel 24. While the hitch frame 18 is pivotally coupled to the main frame 14 in the illustrated embodiment, in other embodiments, the hitch frame may be movably coupled to the main frame by a linkage assembly (e.g., four bar linkage assembly, etc.) or another suitable assembly/mechanism that enables the hitch to move along a vertical axis 25 relative to the main frame.

As illustrated, the agricultural implement 10 includes wheel assemblies 26 movably coupled to the main frame 14. In the illustrated embodiment, each wheel assembly 26 includes a wheel frame and a wheel 28 rotatably coupled to the wheel frame. The wheels 28 of the wheel assemblies 26 are configured to engage the surface 30 of the soil 32, and the wheel assemblies 26 are configured to support at least a portion of the weight of the agricultural implement 10. In the illustrated embodiment, each wheel frame is pivotally coupled to the main frame 14, thereby facilitating adjustment of the position of each wheel 28 along the vertical axis 25. However, in other embodiments, at least one wheel frame may be movably coupled to the main frame by another suitable connection (e.g., sliding connection, linkage assembly, etc.) that facilitates adjustment of the vertical position of the respective wheel(s).

In the illustrated embodiment, the agricultural implement 10 includes ground engaging tools, such as the illustrated disc blades 34, tillage point assemblies 36, and finishing discs 38. The disc blades 34 are configured to engage a top layer of the soil 32. As the agricultural implement 10 is towed through the field, the disc blades 34 are driven to rotate, thereby breaking up the top layer. In the illustrated embodiment, the disc blades 34 are arranged in two rows. However, in alternative embodiments, the disc blades may be arranged in more or fewer rows (e.g., 1, 2, 3, 4, 5, 6, or more). In addition, the angle of each row relative to the direction of travel 24 may be selected to control the interaction of the disc blades 34 with the top layer of soil 32. The tillage point assemblies 36 are configured to engage the soil 32 at a greater depth 40, thereby breaking up a lower layer of the soil. Each tillage point assembly 36 includes a tillage point 42 and a shank 44. The shank 44 is configured to position the tillage point 42 at the depth 40 beneath the soil surface 30, and the tillage point 42 is configured to break up the soil. The shape of each tillage point 42, the arrangement of the tillage point assemblies 36, and the number of tillage point assemblies 36 may be selected to control tillage within the field. Furthermore, as the agricultural implement 10 is towed through the field, the finishing discs 38 are driven to rotate, thereby sizing soil clods, leveling the soil surface, smoothing the soil surface, cutting residue on the soil surface, or a combination thereof.

In the illustrated embodiment, the disc blades 34 are rotatably coupled to a sub-frame 41, and the sub-frame 41 is movably coupled to the main frame 14. As discussed in detail below, the sub-frame 41 is configured to move along the vertical axis 25 relative to the main frame 14 and the soil surface 30, thereby controlling the penetration depth of the disc blades 34. Furthermore, in certain embodiments, the sub-frame 41 is configured to tilt in a fore-aft direction (e.g., about a lateral axis perpendicular to the direction of travel 24), and/or the sub-frame 41 is configured to tilt in a side-to-side direction (e.g., about a longitudinal axis 43 parallel to the direction of travel 24). The sub-frame 41 may be coupled to the main frame 14 by any suitable device configured to facilitate movement/tilting of the sub-frame 41 (e.g., a linkage assembly, a sliding connection, etc.). While the agricultural implement 10 includes a single sub-frame 41 in the illustrated embodiment, in other embodiments, the agricultural implement may include more or fewer sub-frames (e.g., 0, 1, 2, 3, 4, or more). Furthermore, while the disc blades are coupled to the sub-frame in the illustrated embodiment, in other embodiments, other suitable type(s) of ground engaging tool(s) may be coupled to the sub-frame (e.g., alone or in combination with the disc blades).

In the illustrated embodiment, the finishing discs 38 are rotatably coupled to a finishing disc frame 45, and the finishing disc frame 45 is pivotally coupled to the main frame 14. In addition, biasing member(s) 47 extend between the main frame 14 and the finishing disc frame 45. The biasing member(s) 47 are configured to urge the finishing disc frame 45 toward the surface 30 of the soil 32, thereby driving the finishing discs 38 to engage the soil. While the finishing disc frame is pivotally coupled to the main frame in the illustrated embodiment, in other embodiments, the finishing disc frame may be movable coupled to the main frame by a linkage assembly (e.g., four bar linkage assembly, etc.) or another suitable assembly/mechanism that enables the finishing disc frame to move vertically relative to the main frame. Furthermore, in certain embodiments, the finishing disc frame may be non-translatably and/or non-rotatably coupled to the main frame, or the finishing disc frame may be omitted, and the finishing discs may be coupled to the main frame.

While the illustrated agricultural implement includes the disc blades 34, the tillage point assemblies 36, and the finishing discs 38, in other embodiments, the agricultural implement may include other and/or additional ground engaging tool(s). For example, the disc blades, the tillage point assemblies, the finishing discs, or a combination thereof, may be omitted in certain embodiments. Furthermore, in certain embodiments, the agricultural implement may include one or more other suitable ground engaging tools, such as coulter(s), opener(s), and tine(s), among other suitable ground engaging tools. Furthermore, while the agricultural implement 10 is a primary tillage implement in the illustrated embodiment, in other embodiments, the agricultural implement may be a vertical tillage implement, another suitable type of tillage implement, a seeding implement, a planting implement, or another suitable type of implement.

In the illustrated embodiment, the agricultural implement 10 includes a frame control system 12 configured to control a position (e.g., a vertical position) and/or an orientation (e.g., a fore-aft orientation and/or a side-to-side orientation) of the sub-frame 41 and, in certain embodiments, the main frame 14. The frame control system 12 includes a first sensor 46 positioned at (e.g., coupled to) a forward end portion 48 the main frame 14 and directed toward the surface 30 of the soil 32. The first sensor 46 is configured to emit a first output signal 50 toward the soil surface 30 and to receive a first return signal indicative of a first height 52 of the forward end portion 48 of the main frame 14 above the soil surface 30. In addition, the frame control system 12 includes a second sensor 54 positioned at (e.g., coupled to) a rearward end portion 56 of the main frame 14 and directed toward the surface 30 of the soil 32. The second sensor 54 is configured to emit a second output signal 58 toward the soil surface 30 and to receive a second return signal indicative of a second height 60 of the rearward end portion 56 of the main frame 14 above the soil surface 30. Furthermore, the frame control system 12 includes a third sensor 62 positioned at (e.g., coupled to) a forward end portion 64 of the sub-frame 41 and directed toward the surface 30 of the soil 32. The third sensor 62 is configured to emit a third output signal 66 toward the soil surface 30 and to receive a third return signal indicative of a third height 68 of the forward end portion 64 of the sub-frame 41 above the soil surface 30. The frame control system 12 also includes a fourth sensor 70 positioned at (e.g., coupled to) a rearward end portion 72 of the sub-frame 41 and directed toward the surface 30 of the soil 32. The fourth sensor 70 is configured to emit a fourth output signal 74 toward the soil surface and to receive a fourth return signal indicative of a fourth height 76 of the rearward end portion 72 of the sub-frame 41 above the soil surface 30.

As used herein, "forward end portion" refers to a portion of the total length of the frame (e.g., main frame or sub-frame) along the direction of travel 24 that includes the forward end of the frame. The portion may include 1 percent, 2 percent, 5 percent, 10 percent, or 15 percent of the total length of the frame along the direction of travel 24. Furthermore, in certain embodiments, the first/third sensor may be mounted to the forward end portion of the respective frame via an extension that positions the first/third sensor forward of the forward end of the respective frame. In addition, as used herein, "rearward end portion" refers to a portion of the total length of the frame (e.g., main frame or sub-frame) along the direction of travel 24 that includes the rearward end of the frame. The portion may include 1 percent, 2 percent, 5 percent, 10 percent, or 15 percent of the total length of the frame along the direction of travel 24. Furthermore, in certain embodiments, the second/fourth sensor may be mounted to the rearward end portion of the respective frame via an extension that positions the second/fourth sensor rearward of the rearward end of the respective frame.

Furthermore, the frame control system 12 includes a first main frame actuator 78 coupled to the main frame 14 and to the hitch frame 18 of the hitch assembly 16. The first main frame actuator 78 is configured to control a position of the hitch 20 of the hitch assembly 16 relative to the main frame 14 along the vertical axis 25. While the frame control system 12 includes a single first main frame actuator 78 in the illustrated embodiment, in other embodiments, the frame control system may include more first main frame actuators extending between the main frame and the hitch frame. Furthermore, while the first main frame actuator 78 is coupled to the hitch frame 18 in the illustrated embodiment, in other embodiments, the first main frame actuator may be coupled directly to the hitch or another suitable element of the hitch assembly. In addition, the frame control system 12 includes a second main frame actuator 80 coupled to the main frame 14 and to the wheel frame of a first wheel assembly 82. The second main frame actuator 80 is configured to control a position of the first wheel assembly 82 relative to the main frame 14 along the vertical axis 25. While the frame control system 12 includes a single second main frame actuator 80 in the illustrated embodiment, in other embodiments, the frame control system may include more second main frame actuators extending between the main frame and the first wheel assembly. In certain embodiments, the agricultural implement may include a single wheel assembly, and the second main frame actuator may be coupled to the single wheel assembly. In other embodiments, the agricultural implement may include multiple wheel assemblies, and the second main frame actuator may be coupled to the wheel assemblies (e.g., via a linkage assembly). Furthermore, in certain embodiments, the agricultural implement may include multiple wheel assemblies, and at least one second main frame actuator may be coupled to each respective wheel assembly.

In the illustrated embodiment, the frame control system 12 includes a first sub-frame actuator 84 coupled to the sub-frame 41 and to the main frame 14. The first sub-frame actuator 84 is configured to control a position (e.g., first position) of the forward end portion 64 of the sub-frame 41 relative to the main frame 14 along the vertical axis 25. In addition, the frame control system 12 includes a second sub-frame actuator 86 coupled to the sub-frame 41 and to the main frame 14. The second sub-frame actuator 86 is configured to control a position (e.g., second position) of the rearward end portion 72 of the sub-frame 41 relative to the main frame 14 along the vertical axis 25. As previously discussed, the sub-frame 41 may be coupled to the main frame 14 by a suitable device configured to facilitate tilting of the sub-frame 41 in the fore-aft direction (e.g., about the lateral axis). Accordingly, the first and second sub-frame actuators may control the height of the sub-frame above the soil surface and the fore-aft orientation of the sub-frame relative to the main frame. While the frame control system 12 includes a single first sub-frame actuator 84 and a single second sub-frame actuator 86 in the illustrated embodiment, in other embodiments, the frame control system may include additional first sub-frame actuators configured to control the position of the forward end portion of the sub-frame and/or additional second sub-frame actuators configured to control the position of the rearward end portion of the sub-frame. Furthermore, in certain embodiments, the second sub-frame actuator(s) may be omitted, and the first sub-frame actuator(s) may be configured to control the position of the sub-frame relative to the main frame along the vertical axis. In such embodiments, the sub-frame may be coupled to the main frame by a suitable device that enables the sub-frame to move along the vertical axis and blocks rotation of the sub-frame (e.g., about the lateral axis, about the vertical axis, and about the longitudinal axis).

As discussed in detail below, the frame control system 12 includes a controller communicatively coupled to the first sensor 46, to the second sensor 54, to the third sensor 62, to the fourth sensor 70, to the first main frame actuator 78, to the second main frame actuator 80, to the first sub-frame actuator 84, and to the second sub-frame actuator 86. In certain embodiments, the controller is configured to control the first sub-frame actuator 84 and the second sub-frame actuator 86 such that a difference between the third height 68 of the forward end portion 64 of the sub-frame 41 and a first target height (e.g., corresponding to a target penetration depth of corresponding ground engaging tool(s) on the sub-frame 41) is less than a threshold value (e.g., 1 mm, 2 mm, 3 mm, 5 mm, 10 mm, 15 mm, or 20 mm), and a difference between the fourth height 76 of the rearward end portion 72 of the sub-frame 41 and a second target height (e.g., corresponding to a target penetration depth of corresponding ground engaging tool(s) on the sub-frame 41) is less than the threshold value. In certain embodiments, the first target height is different than the second target height. Accordingly, the controller may control the first and second sub-frame actuators such that the sub-frame tilts about the lateral axis. As a result, the penetration depth of the ground engaging tools (e.g., disc blades) proximate to the forward end portion of the sub-frame (e.g., the first row of disc blades) may be adjusted substantially independently of the penetration depth of the ground engaging tools (e.g., disc blades) proximate to the rearward end portion of the sub-frame (e.g., the second row of disc blades), e.g., by independently controlling the third height 68 and the fourth height 76. For example, as the agricultural implement traverses a field, the controller may control the first and second sub-frame actuators to selectively increase or decrease the penetration depth of the forward disc blades while substantially maintaining the penetration depth of the rearward disc blades. Accordingly, control of the tillage operation may be enhanced.

Furthermore, in certain embodiments, the first target height may be the same as the second target height. Accordingly, the target height may be substantially maintained along the length of the sub-frame (e.g., along the fore-aft/longitudinal direction). The target height may be selected to establish the target penetration depth of at least a portion of the ground engaging tools (e.g., all of the ground engaging tools) on the sub-frame beneath the soil surface. In addition, in certain embodiments, the controller is configured to control the first sub-frame actuator 84 and the second sub-frame actuator 86 such that a difference between the third height 68 of the forward end portion 64 of the sub-frame 41 and the fourth height 76 of the rearward end portion 72 of the sub-frame 41 is less than a second threshold value (e.g., 1 mm, 2 mm, 3 mm, 5 mm, 10 mm, 15 mm, or 20 mm). The second threshold value may be the same or different from the first threshold value (e.g., the threshold value associated with the difference between each height and the target height). For example, the second threshold value may be greater than the first threshold value, such that during operation of the agricultural implement, the difference between the third height and the fourth height may be greater than the difference between each height and the target height (e.g., while the forward end portion of the sub-frame is above the target height, and the rearward end portion of the sub-frame is below the target height).

Because the controller controls the first and second sub-frame actuators such that the difference between the third and fourth heights is less than the second threshold value and/or such that the difference between each height and the target height is less than the first threshold value, the sub-frame may be substantially maintained at an orientation that is parallel to the soil surface along the fore-aft/longitudinal direction during operation of the agricultural implement (e.g., as compared to a sub-frame that is substantially maintained in a level orientation perpendicular to the direction of gravitational acceleration). Accordingly, at least a portion of the ground engaging tools (e.g., all of the ground engaging tools) on the sub-frame may be substantially maintained at a target penetration depth beneath the soil surface, thereby enhancing the effectiveness of the agricultural operation (e.g., as compared to an agricultural implement having an uncontrolled sub-frame that tilts relative to the soil surface during operations, thereby causing the penetration depth of the ground engaging tools to vary). As discussed in detail below, the controller may control the first and second main frame actuators to control the first and second heights of the main frame above the soil surface. However, in certain embodiments, the controller may be configured to control the orientation of the sub-frame without controlling the first and second heights of the main frame. For example, in certain embodiments, the height of the main frame above the soil surface may be controlled via one or more manual controls (e.g., turnbuckle(s), etc.). In such embodiments, the first main frame actuator and/or the second main frame actuator may be omitted.

As previously discussed, in certain embodiments, the second sub-frame actuator(s) may be omitted, and the first sub-frame actuator(s) may be configured to control the position of the sub-frame relative to the main frame along the vertical axis. In such embodiments, the sub-frame may be coupled to the main frame by a suitable device that enables the sub-frame to move along the vertical axis and blocks rotation of the sub-frame (e.g., about the lateral axis, about the vertical axis, and about the longitudinal axis). Furthermore, in such embodiments, the controller is configured to control the first sub-frame actuator such that a difference between the sub-frame height (e.g., height of the sub-frame above the soil surface) and a target height (e.g., corresponding to a target penetration depth of the ground engaging tools on the sub-frame) is less than a threshold value (e.g., 1 mm, 2 mm, 3 mm, 5 mm, 10 mm, 15 mm, or 20 mm). Accordingly, at least a portion of the ground engaging tools (e.g., all of the ground engaging tools) on the sub-frame may be substantially maintained at a target penetration depth beneath the soil surface, thereby enhancing the effectiveness of the agricultural operation. Because a single height of the sub-frame above the soil surface is utilized for controlling the sub-frame, one of the sub-frame sensors (e.g., the fourth sensor) may be omitted. The remaining sensor may be positioned at (e.g., coupled to) any suitable location on the sub-frame (e.g., the longitudinal center of the sub-frame). Due to the reduced number of sensors and actuators, the cost of the frame control system may be reduced, as compared to the embodiments disclosed above with multiple sensors and actuators for the sub-frame.

In certain embodiments, the controller is configured to control the first main frame actuator 78 and the second main frame actuator 80 such that a difference between the first height 52 of the forward end portion 48 of the main frame 14 and a first target height is less than a threshold value (e.g., 1 mm, 2 mm, 3 mm, 5 mm, 10 mm, 15 mm, or 20 mm), and a difference between the second height 60 of the rearward end portion 56 of the main frame 14 and a second target height is less than the threshold value. In certain embodiments, the first target height is different than the second target height. Accordingly, the controller may control the first and second main frame actuators such that the main frame tilts about the lateral axis. As a result, the penetration depth of the ground engaging tools (e.g., tillage point assemblies) proximate to the rearward end portion of the main frame may be adjusted substantially independently of the penetration depth of the ground engaging tools (e.g., disc blades) proximate to the forward end portion of the main frame (e.g., which may be controlled by controlling the height of the sub-frame), e.g., by independently controlling the first height 52 and the second height 60. For example, as the agricultural implement traverses a field, the controller may control the first and second main frame actuators to selectively increase or decrease the penetration depth of the tillage point assemblies while substantially maintaining the penetration depth of the disc blades. Accordingly, control of the tillage operation may be enhanced.

Furthermore, in certain embodiments, the first target height may be the same as the second target height. Accordingly, the target height may be substantially maintained along the length of the main frame (e.g., along the fore-aft/longitudinal direction). The target height may be selected to establish the target penetration depth of at least a portion of the ground engaging tools (e.g., all of the ground engaging tools) on the main frame beneath the soil surface. In addition, in certain embodiments, the controller is configured to control the first main frame actuator 78 and the second main frame actuator 80 such that a difference between the first height 52 of the forward end portion 48 of the main frame 14 and the second height 60 of the rearward end portion 56 of the main frame 14 is less than a second threshold value (e.g., 1 mm, 2 mm, 3 mm, 5 mm, 10 mm, 15 mm, or 20 mm). The second threshold value may be the same or different from the first threshold value (e.g., the threshold value associated with the difference between each height and the target height). For example, the second threshold value may be greater than the first threshold value, such that during operation of the agricultural implement, the difference between the first height and the second height may be greater than the difference between each height and the target height (e.g., while the forward end portion of the main frame is above the target height, and the rearward end portion of the main frame is below the target height).

Because the controller controls the first and second main frame actuators such that the difference between the first and second heights is less than the second threshold value and/or such that the difference between each height and the target height is less than the first threshold value, the main frame may be substantially maintained at an orientation that is parallel to the soil surface along the fore-aft/longitudinal direction during operation of the agricultural implement (e.g., as compared to a main frame that is substantially maintained in a level orientation perpendicular to the direction of gravitational acceleration). Accordingly, at least a portion of the ground engaging tools (e.g., all of the ground engaging tools) on the main frame may be substantially maintained at a target penetration depth beneath the soil surface, thereby enhancing the effectiveness of the agricultural operation (e.g., as compared to an agricultural implement having an uncontrolled main frame that tilts relative to the soil surface during operations, thereby causing the penetration depth of the ground engaging tools to vary). As previously discussed, in certain embodiments, the controller may control the first and second sub-frame actuators to control the fore-aft orientation of the sub-frame relative to the main frame. Accordingly, the controller may control the fore-aft orientation of the main frame and the fore-aft orientation of the sub-frame. However, in other embodiments, the controller may control the fore-aft orientation of the main frame and only the height of the sub-frame, or the controller may control the fore-aft orientation of the main frame, and the height of the sub-frame may be manually controlled (e.g., via a turnbuckle, etc.).

In certain embodiments, the hitch assembly may be coupled to the wheel assemblies by a mechanical linkage. In addition, the second main frame actuators may extend from the mechanical linkage to the respective wheel assemblies. Accordingly, the controller is configured to control the first and second main frame actuators to control the first and second heights of the main frame. Furthermore, in certain embodiments, the hitch main frame actuator may be omitted, and the hitch frame may freely move (e.g., rotate) relative to the main frame. In such embodiments, the agricultural implement may include one or more forward wheel assemblies (e.g., one or more gauge wheel assemblies), and a main frame actuator (e.g., first main frame actuator) may extend from the main frame to each respective forward wheel assembly. The controller may control each wheel actuator to control the first and second heights of the main frame.

In certain embodiments, a single sensor (e.g., the first sensor 46) may be positioned at (e.g., coupled to) any suitable location on the main frame 14 (e.g., the longitudinal center of the main frame). In such embodiments, the controller may be configured to control the first and second main frame actuators such that a difference between the main frame height (e.g., height of the main frame above the soil surface) and a target height (e.g., corresponding to a target penetration depth of ground engaging tools on the main frame) is less than a threshold value (e.g., 1 mm, 2 mm, 3 mm, 5 mm, 10 mm, 15 mm, or 20 mm). Accordingly, at least a portion of the ground engaging tools (e.g., all of the ground engaging tools) on the main frame may be substantially maintained at a target penetration depth beneath the soil surface, thereby enhancing the effectiveness of the agricultural operation. Due to the reduced number of sensors, the cost of the frame control system may be reduced, as compared to the embodiments disclosed above with multiple main frame sensors. In certain embodiments, the hitch assembly may be coupled to the wheel assemblies by a mechanical linkage. In such embodiments, a single actuator (e.g., the first main frame actuator) may control both the position of the hitch and the position of the wheel assemblies along the vertical axis. Accordingly, the single main frame actuator (e.g., first main frame actuator) may control the main frame height, thereby further reducing the cost of the frame control system. Furthermore, in certain embodiments, the hitch main frame actuator may be omitted, and the hitch frame may freely move (e.g., rotate) relative to the main frame. In such embodiments, the agricultural implement may include one or more forward wheel assemblies (e.g., one or more gauge wheel assemblies), and a main frame actuator (e.g., first main frame actuator) may extend from the main frame to each respective forward wheel assembly. The controller may control each wheel actuator to control the height of the main frame above the soil surface. Any of the variations of the sub-frame control disclosed herein (e.g., manual control, fore-aft/side-to-side orientation control, and height control) may be utilized with the single main frame sensor configuration.

In certain embodiments, the illustrated second actuator 64 is configured to move the respective wheel 28 from the illustrated raised position to a lowered position. While the wheels 28 are in the lowered position, the ground engaging tools of the agricultural implement 10 are disengaged from the soil 32 (e.g., to facilitate transport and/or inspection of the agricultural implement 10). The illustrated second actuator 64 may lift the respective wheel 28 from the lowered position to the illustrated raised position (e.g., and other actuators may lift respective wheels from the lowered position to the raised position), thereby causing the ground engaging tools to engage the soil 32. Once the ground engaging tools are engaged with the soil 32, the work vehicle may tow the agricultural implement 10 throughout a field.

Figure 2:
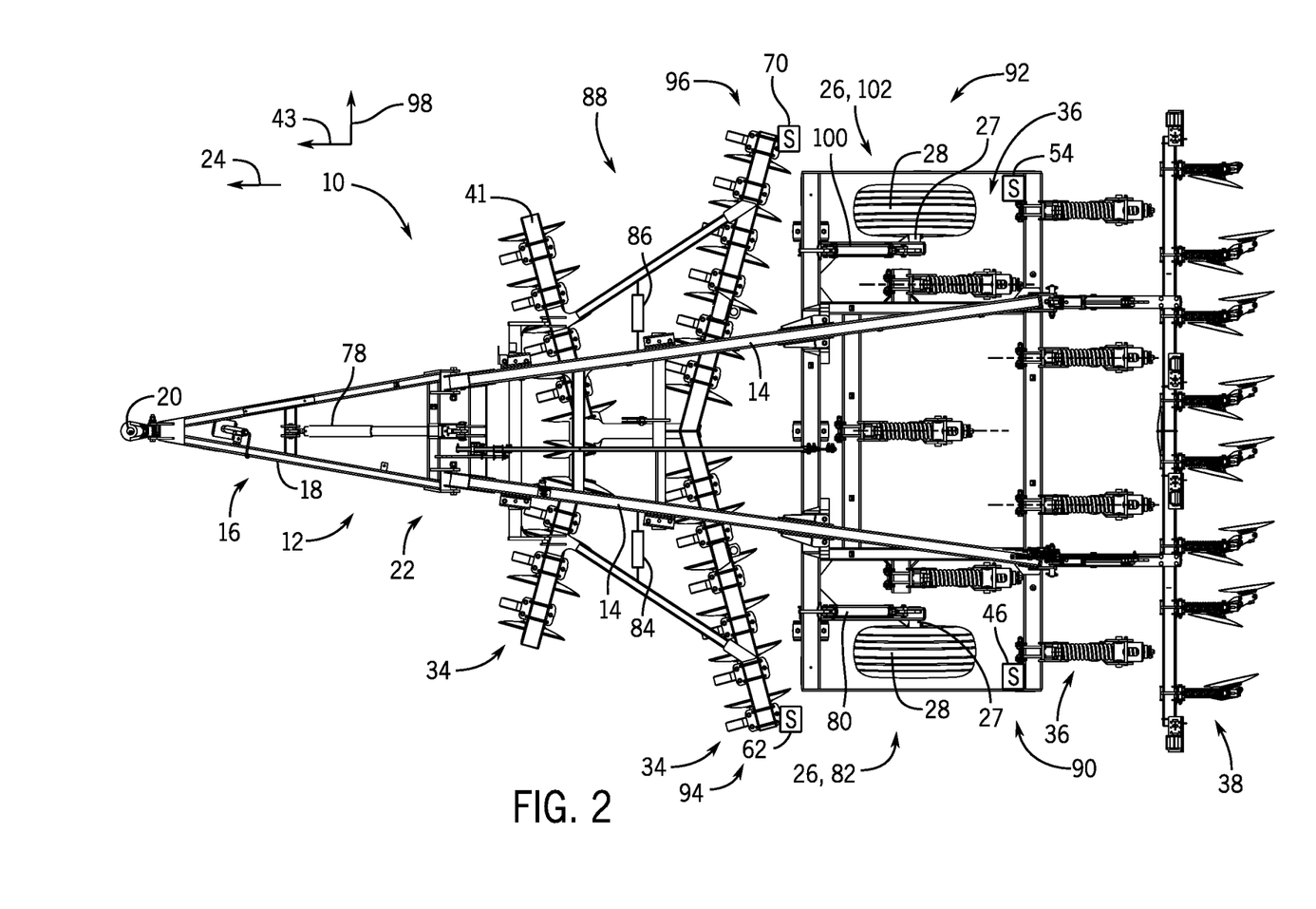
FIG. 2 is a top view of the agricultural implement of FIG. 1 having another embodiment of a frame control system.

FIG. 2 is a top view of the agricultural implement 10 of FIG. 1 having another embodiment of a frame control system 88. As previously discussed, each wheel assembly 26 includes a wheel frame 27 and a wheel 28 rotatably coupled to the wheel frame. In the illustrated embodiment, each wheel frame 27 is pivotally coupled to the main frame 14, thereby facilitating adjustment of the position of each wheel 28 along the vertical axis. However, in other embodiments, at least one wheel frame may be movably coupled to the main frame by another suitable connection (e.g., sliding connection, linkage assembly, etc.) that facilitates adjustment of the vertical position of the respective wheel(s). Furthermore, while the agricultural implement 10 includes two wheel assemblies 26 in the illustrated embodiment, in other embodiments, the agricultural implement may include more or fewer wheel assemblies (e.g., 1, 2, 3, 4, 5, 6, or more). In addition, each wheel assembly may include any suitable number of wheels (e.g., 1, 2, 3, 4, 5, 6, or more).

In the illustrated embodiment, the frame control system 88 includes the first sensor 46 positioned at (e.g., coupled to) a left end portion 90 of the main frame 14 and directed toward the soil surface. The first sensor 46 is configured to emit a first output signal toward the soil surface and to receive a first return signal indicative of a first height of the left end portion 90 of the main frame 14 above the soil surface. In addition, the frame control system 88 includes the second sensor 54 positioned at (e.g., coupled to) a right end portion 92 of the main frame 14 and directed toward the soil surface. The second sensor 54 is configured to emit a second output signal toward the soil surface and to receive a second return signal indicative of a second height of the right end portion 92 of the main frame 14 above the soil surface. Furthermore, the frame control system 88 includes the third sensor 62 positioned at (e.g., coupled to) a left end portion 94 of the sub-frame 41 and directed toward the soil surface. The third sensor 62 is configured to emit a third output signal toward the soil surface and to receive a third return signal indicative of a third height of the left end portion 94 of the sub-frame 41 above the soil surface. The frame control system 88 also includes the fourth sensor 70 positioned at (e.g., coupled to) a right end portion 96 of the sub-frame 41 and directed toward the soil surface. The fourth sensor 70 is configured to emit a fourth output signal toward the soil surface and to receive a fourth return signal indicative of a fourth height of the right end portion 96 of the sub-frame 41 above the soil surface 30.

As used herein, "left end portion" refers to a portion of the total width of the frame (e.g., main frame or sub-frame) along the lateral axis 98 (e.g., perpendicular to the direction of travel 24) that includes the left end of the frame. The portion may include 1 percent, 2 percent, 5 percent, 10 percent, or 15 percent of the total width of the frame along the lateral axis 98. Furthermore, in certain embodiments, the first/third sensor may be mounted to the left end portion of the respective frame via an extension that positions the first/third sensor laterally outward of the left end of the respective frame. In addition, as used herein, "right end portion" refers to a portion of the total width of the frame (e.g., main frame or sub-frame) along the lateral axis 98 (e.g., perpendicular to the direction of travel 24) that includes the right end of the frame. The portion may include 1 percent, 2 percent, 5 percent, 10 percent, or 15 percent of the total width of the frame along the lateral axis 98. Furthermore, in certain embodiments, the second/fourth sensor may be mounted to the right end portion of the respective frame via an extension that positions the second/fourth sensor laterally outward of the right end of the respective frame.

The frame control system 88 includes the first main frame actuator 78 coupled to the main frame 14 and to the hitch frame 18 of the hitch assembly 16. The first main frame actuator 78 is configured to control a position of the hitch 20 of the hitch assembly 16 relative to the main frame 14 along the vertical axis. While the frame control system 88 includes a single first main frame actuator 78 in the illustrated embodiment, in other embodiments, the frame control system may include more first main frame actuators extending between the main frame and the hitch frame. Furthermore, while the first main frame actuator 78 is coupled to the hitch frame 18 in the illustrated embodiment, in other embodiments, the first main frame actuator may be coupled directly to the hitch or another suitable element of the hitch assembly. In addition, the frame control system 88 includes the second main frame actuator 80 coupled to the main frame 14 and to the wheel frame 27 of the first wheel assembly 82. The second main frame actuator 80 is configured to control a position of the first wheel assembly 82 relative to the main frame 14 along the vertical axis. While the frame control system 88 includes a single second main frame actuator 80 in the illustrated embodiment, in other embodiments, the frame control system may include more second main frame actuators extending between the main frame and the first wheel assembly. In the illustrated embodiment, the frame control system 88 includes a third main frame actuator 100 coupled to the main frame 14 and to the wheel frame 27 of a second wheel assembly 102. The second main frame actuator 100 is configured to control a position of the second wheel assembly 102 relative to the main frame 14 along the vertical axis. While the frame control system 88 includes a single third main frame actuator 100 in the illustrated embodiment, in other embodiments, the frame control system may include more third main frame actuators extending between the main frame and the second wheel assembly.

The frame control system 88 includes the first sub-frame actuator 84 coupled to the sub-frame 41 and to the main frame 14. The first sub-frame actuator 84 is configured to control a position (e.g., first position) of the left end portion 94 of the sub-frame 41 relative to the main frame 14 along the vertical axis. In addition, the frame control system 88 includes the second sub-frame actuator 86 coupled to the sub-frame 41 and to the main frame 14. The second sub-frame actuator 86 is configured to control a position (e.g., second position) of the right end portion 96 of the sub-frame 41 relative to the main frame 14 along the vertical axis. As previously discussed, the sub-frame 41 may be coupled to the main frame 14 by a suitable device configured to facilitate tilting of the sub-frame 41 in the side-to-side direction (e.g., about the longitudinal axis 43). Accordingly, the first and second sub-frame actuators may control the height of the sub-frame above the soil surface and the side-to-side orientation of the sub-frame relative to the main frame. While the frame control system 88 includes a single first sub-frame actuator 84 and a single second sub-frame actuator 86 in the illustrated embodiment, in other embodiments, the frame control system may include additional first sub-frame actuators configured to control the position of the left end portion of the sub-frame and/or additional second sub-frame actuators configured to control the position of the right end portion of the sub-frame. Furthermore, in certain embodiments, the second sub-frame actuator(s) may be omitted, and the first sub-frame actuator(s) may be configured to control the position of the sub-frame relative to the main frame along the vertical axis. In such embodiments, the sub-frame may be coupled to the main frame by a suitable device that enables the sub-frame to move along the vertical axis and blocks rotation of the main frame (e.g., about the lateral axis, about the vertical axis, and about the longitudinal axis).

The controller of the frame control system 88 is communicatively coupled to the first sensor 46, to the second sensor 54, to the third sensor 62, to the fourth sensor 70, to the first main frame actuator 78, to the second main frame actuator 80, to the third main frame actuator 100, to the first sub-frame actuator 84, and to the second sub-frame actuator 86. In certain embodiments, the controller is configured to control the first sub-frame actuator 84 and the second sub-frame actuator 86 such that a difference between the third height of the left end portion 94 of the sub-frame 41 and a first target height (e.g., corresponding to a target penetration depth of corresponding ground engaging tool(s) on the sub-frame 41) is less than a threshold value (e.g., 1 mm, 2 mm, 3 mm, 5 mm, 10 mm, 15 mm, or 20 mm), and a difference between the fourth height of the right end portion 96 of the sub-frame 41 and a second target height (e.g., corresponding to a target penetration depth of corresponding ground engaging tool(s) on the sub-frame 41) is less than the threshold value. In certain embodiments, the first target height is different than the second target height. Accordingly, the controller may control the first and second sub-frame actuators such that the sub-frame tilts about the longitudinal axis 43. As a result, the penetration depth of the ground engaging tools (e.g., disc blades) proximate to the left end portion of the sub-frame may be adjusted substantially independently of the penetration depth of the ground engaging tools (e.g., disc blades) proximate to the right end portion of the sub-frame, e.g., by independently controlling the third height and the fourth height. Accordingly, control of the tillage operation may be enhanced.

Furthermore, in certain embodiments, the first target height may be the same as the second target height. Accordingly, the target height may be substantially maintained along the width of the sub-frame (e.g., along the side-to-side/lateral direction). The target height may be selected to establish the target penetration depth of at least a portion of the ground engaging tools (e.g., all of the ground engaging tools) on the sub-frame beneath the soil surface. In addition, in certain embodiments, the controller is configured to control the first sub-frame actuator 84 and the second sub-frame actuator 86 such that a difference between the third height of the left end portion 94 of the sub-frame 41 and the fourth height of the right end portion 96 of the sub-frame 41 is less than a second threshold value (e.g., 1 mm, 2 mm, 3 mm, 5 mm, 10 mm, 15 mm, or 20 mm). The second threshold value may be the same or different from the first threshold value (e.g., the threshold value associated with the difference between each height and the target height). For example, the second threshold value may be greater than the first threshold value, such that during operation of the agricultural implement, the difference between the third height and the fourth height may be greater than the difference between each height and the target height (e.g., while the left end portion of the sub-frame is above the target height, and the right end portion of the sub-frame is below the target height).

Because the controller controls the first and second sub-frame actuators such that the difference between the third and fourth heights is less than the second threshold value and/or such that the difference between each height and the target height is less than the first threshold value, the sub-frame may be substantially maintained at an orientation that is parallel to the soil surface along the side-to-side/lateral direction during operation of the agricultural implement (e.g., as compared to a sub-frame that is substantially maintained in a level orientation perpendicular to the direction of gravitational acceleration). Accordingly, at least a portion of the ground engaging tools (e.g., all of the ground engaging tools) on the sub-frame may be substantially maintained at a target penetration depth beneath the soil surface, thereby enhancing the effectiveness of the agricultural operation (e.g., as compared to an agricultural implement having an uncontrolled sub-frame that tilts relative to the soil surface during operations, thereby causing the penetration depth of the ground engaging tools to vary). As discussed in detail below, the controller may control the first, second, and third main frame actuators to control the first and second heights of the main frame above the soil surface. However, in certain embodiments, the controller may be configured to control the orientation of the sub-frame without controlling the first and second heights of the main frame. For example, in certain embodiments, the height of the main frame above the soil surface may be controlled via one or more manual controls (e.g., turnbuckle(s), etc.). In such embodiments, the first main frame actuator and/or the second main frame actuator may be omitted.

In certain embodiments, the sub-frame 41 is coupled to the main frame 14 by a linkage assembly that enables the sub-frame 41 to tilt about the lateral axis 98 and about the longitudinal axis 43. In such embodiments, at least three sensors may be positioned at (e.g., coupled to) at least three respective portions of the sub-frame (e.g., the forward end portion, the rearward end portion, the left end portion, and the right end portion). In addition, at least three sub-frame actuators may be coupled to the sub-frame and to the main frame, in which the sub-frame actuators are configured to control the orientation of the sub-frame relative to the main frame about the lateral axis and about the longitudinal axis. The controller, which is communicatively coupled to each sensor and to each sub-frame actuator, may be configured to control the sub-frame actuators such that a difference between the height of the forward end portion and the height of the rearward end portion is less than the second threshold value, and a difference between the height of the right end portion and the height of the left end portion is less than the second threshold value. Additionally or alternatively, the controller may be configured to control the sub-frame actuators such that a difference between each height and a common target height is less than the first threshold value. Furthermore, in certain embodiments, the controller may be configured to control the sub-frame actuators such that a difference between each height and a respective target height is less than the first threshold value (e.g., in which at least two respective target heights are difference than one another).

In certain embodiments, the controller is configured to control the first main frame actuator 78, the second main frame actuator 80, and the third main frame actuator 100 such that a difference between the first height of the left end portion 90 of the main frame 14 and a first target height is less than a threshold value (e.g., 1 mm, 2 mm, 3 mm, 5 mm, 10 mm, 15 mm, or 20 mm), and a difference between the second height of the right end portion 92 of the main frame 14 and a second target height is less than the threshold value. In certain embodiments, the first target height is different than the second target height. Accordingly, the controller may control the first, second, and third main frame actuators such that the main frame tilts about the longitudinal axis 43. As a result, the penetration depth of the ground engaging tools (e.g., tillage point assemblies) proximate to the left end portion of the main frame may be adjusted substantially independently of the penetration depth of the ground engaging tools (e.g., tillage point assemblies) proximate to the right end portion of the main frame, e.g., by independently controlling the first height and the second height. Accordingly, control of the tillage operation may be enhanced.

Furthermore, in certain embodiments, the first target height may be the same as the second target height. Accordingly, the target height may be substantially maintained along the width of the main frame (e.g., along the side-to-side/lateral direction). The target height may be selected to establish the target penetration depth of at least a portion of the ground engaging tools (e.g., all of the ground engaging tools) on the main frame beneath the soil surface. In addition, in certain embodiments, the controller is configured to control the first main frame actuator 78, the second main frame actuator 80, and the third main frame actuator 100 such that a difference between the first height of the left end portion 90 of the main frame 14 and the second height of the right end portion 92 of the main frame 14 is less than a second threshold value (e.g., 1 mm, 2 mm, 3 mm, 5 mm, 10 mm, 15 mm, or 20 mm). The second threshold value may be the same or different from the first threshold value (e.g., the threshold value associated with the difference between each height and the target height). For example, the second threshold value may be greater than the first threshold value, such that during operation of the agricultural implement, the difference between the first height and the second height may be greater than the difference between each height and the target height (e.g., while the left end portion of the main frame is above the target height, and the right end portion of the main frame is below the target height).

Because the controller controls the first, second, and third main frame actuators such that the difference between the first and second heights is less than the second threshold value and/or such that the difference between each height and the target height is less than the first threshold value, the main frame may be substantially maintained at an orientation that is parallel to the soil surface along the side-to-side/lateral direction during operation of the agricultural implement (e.g., as compared to a main frame that is substantially maintained in a level orientation perpendicular to the direction of gravitational acceleration). Accordingly, at least a portion of the ground engaging tools (e.g., all of the ground engaging tools) on the main frame may be substantially maintained at a target penetration depth beneath the soil surface, thereby enhancing the effectiveness of the agricultural operation (e.g., as compared to an agricultural implement having an uncontrolled main frame that tilts relative to the soil surface during operations, thereby causing the penetration depth of the ground engaging tools to vary).

In certain embodiments, the hitch assembly may be coupled to the wheel assemblies by a mechanical linkage. In addition, the second and third main frame actuators may extend from the mechanical linkage to the respective wheel assemblies. Accordingly, the controller is configured to control the first, second, and third main frame actuators to control the first and second heights of the main frame. Furthermore, in certain embodiments, the hitch main frame actuator may be omitted, and the hitch frame may freely move (e.g., rotate) relative to the main frame. In such embodiments, the agricultural implement may include one or more forward wheel assemblies (e.g., one or more gauge wheel assemblies), and a main frame actuator may extend from the main frame to each respective forward wheel assembly. The first main frame actuator(s) may control the position of each wheel assembly on the left side of the main frame (e.g., the first wheel assembly and, if present, a left forward wheel assembly), and the second main frame actuator(s) may control the position of each wheel assembly on the right side of the main frame (e.g., the second wheel assembly and, if present, a right forward wheel assembly). Accordingly, the controller may control the first and second main frame actuators to control the first and second heights of the main frame.

In certain embodiments, at least three sensors may be positioned at (e.g., coupled to) at least three respective portions of the main frame (e.g., the forward end portion, the rearward end portion, the left end portion, and the right end portion). The controller, which is communicatively coupled to each sensor and to each main frame actuator, may be configured to control the first, second, and third main frame actuators such that a difference between the height of the forward end portion and the height of the rearward end portion is less than the second threshold value, and a difference between the height of the right end portion and the height of the left end portion is less than the second threshold value. Additionally or alternatively, the controller may be configured to control the first, second, and third main frame actuators such that a difference between each height and a common target height is less than the first threshold value. Furthermore, in certain embodiments, the controller may be configured to control the first, second, and third main frame actuators such that a difference between each height and a respective target height is less than the first threshold value (e.g., in which at least two respective target heights are difference than one another).

As previously discussed, in certain embodiments, the controller may control the sub-frame actuators to control the side-to-side and/or the fore-aft orientation of the sub-frame relative to the main frame. Accordingly, the controller may control the side-to-side and/or the fore-aft orientation of the main frame and the side-to-side and/or fore-aft orientation of the sub-frame. However, in other embodiments, the controller may control the side-to-side and/or the fore-aft orientation of the main frame and only the height of the sub-frame, or the controller may control the side-to-side and/or the fore-aft orientation of the main frame, and height of the sub-frame may be manually controlled (e.g., via a turnbuckle, etc.). In addition, in certain embodiments, the controller may control the side-to-side and/or the fore-aft orientation of the sub-frame and only the height of the main frame, or the controller may control the side-to-side and/or the fore-aft orientation of the sub-frame, and the height of the main frame may be manually controlled (e.g., via a turnbuckle, etc.).

Figure 3:
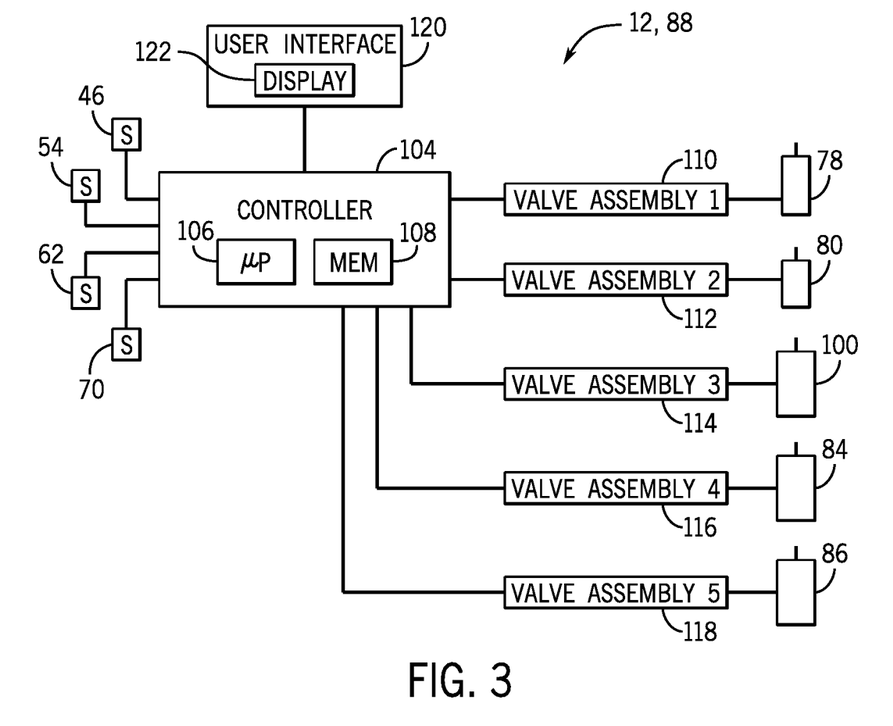
FIG. 3 is a schematic view of an embodiment of a frame control system that may be employed within the agricultural implement of FIG. 1.

FIG. 3 is a schematic view of an embodiment of a frame control system 12, 88 that may be employed within the agricultural implement of FIG. 1. In the illustrated embodiment, the frame control system 12, 88 includes a controller 104 communicatively coupled to the first sensor 46, to the second sensor 54, to the third sensor 62, to the fourth sensor 70, to the first main frame actuator 78, to the second main frame actuator 80, to the third main frame actuator 100, to the first sub-frame actuator 84, and to the second sub-frame actuator 86. The controller 104 is configured to control the first, second, and third main frame actuators and/or the first and second sub-frame actuators to control the orientation/height of the main frame and/or the orientation/height of the sub-frame. In the illustrated embodiment, the controller 104 is an element of the frame control system 12, 88 and may be located in/on the agricultural implement. However, in other embodiments, the controller may be located in/on a work vehicle coupled to the agricultural implement. Furthermore, in certain embodiments, one or more functions of the controller may be distributed across multiple control devices (e.g., the control devices forming the controller).

In certain embodiments, the controller 104 is an electronic controller having electrical circuitry configured to control the first, second, and third main frame actuators and/or the first and second sub-frame actuators. In the illustrated embodiment, the controller 104 includes a processor, such as the illustrated microprocessor 106, and a memory device 108. The controller 104 may also include one or more storage devices and/or other suitable components. The processor 106 may be used to execute software, such as software for controlling the main frame actuators and/or the sub-frame actuators, and so forth. Moreover, the processor 106 may include multiple microprocessors, one or more "general-purpose" microprocessors, one or more special-purpose microprocessors, and/or one or more application specific integrated circuits (ASICS), or some combination thereof. For example, the processor 106 may include one or more reduced instruction set (RISC) processors.

The memory device 108 may include a volatile memory, such as random access memory (RAM), and/or a nonvolatile memory, such as read-only memory (ROM). The memory device 108 may store a variety of information and may be used for various purposes. For example, the memory device 108 may store processor-executable instructions (e.g., firmware or software) for the processor 106 to execute, such as instructions for controlling the main frame actuators and/or the sub-frame actuators, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the main frame actuators and/or the sub-frame actuators, etc.), and any other suitable data.

As previously discussed, each sensor (e.g., the first sensor 46, the second sensor 54, the third sensor 62, and the fourth sensor 70) is configured to emit a respective output signal toward the soil surface and to receive a respective return signal indicative of a respective height of a respective portion of the main frame/sub-frame above the soil surface. The first sensor 46, the second sensor 54, the third sensor 62, and the fourth sensor 70 may include any suitable type of sensor configured to emit an output signal toward the soil surface and to receive a return signal indicative of a distance between the sensor and the soil surface. In certain embodiments, the first sensor, the second sensor, the third sensor, the fourth sensor, or a combination thereof, may include an infrared sensor configured to emit an infrared signal toward the soil surface and to receive a return infrared signal from the soil surface. Furthermore, in certain embodiments, the first sensor, the second sensor, the third sensor, the fourth sensor, or a combination thereof, may include a radio detection and ranging (RADAR) sensor (e.g., millimeter wave (MMW) scanner, etc.) configured to emit a radio frequency signal toward the soil surface and to receive a return radio frequency signal from the soil surface. In addition, in certain embodiments, the first sensor, the second sensor, the third sensor, the fourth sensor, or a combination thereof, may include a lidar sensor (e.g., time-of-flight scanning laser, etc.) configured to emit a light signal toward the soil surface and to receive a return light signal from the soil surface. By way of further example, in certain embodiments, the first sensor, the second sensor, the third sensor, the fourth sensor, or a combination thereof, may include an ultrasonic sensor configured to emit an ultrasonic signal toward the soil surface and to receive a return ultrasonic signal from the soil surface. Furthermore, in certain embodiments, the first sensor, the second sensor, the third sensor, the fourth sensor, or a combination thereof, may include a capacitive sensor configured to emit an electric signal/field toward the soil surface and to receive a return electric signal from the soil surface (e.g., in the form of a change to the emitted electric signal/field). While the first sensor, the second sensor, the third sensor, and the fourth sensor are non-contact sensors (e.g., configured to emit an output signal and to receive a return signal) in the illustrated embodiment, in other embodiments, at least one of the first sensor, the second sensor, the third sensor, and the fourth sensor may be a contact sensor (e.g., including a ground contact element) configured to monitor the height of the respective portion of the main frame/sub-frame above the soil surface.

In the illustrated embodiment, the first main frame actuator 78 includes a hydraulic cylinder configured to control the position of the hitch of the hitch assembly relative to the main frame along the vertical axis. In addition, the frame control system 12, 88 includes a first valve assembly 110 configured to control a flow of fluid (e.g., hydraulic fluid) to the first main frame actuator 78/hydraulic cylinder. Accordingly, the controller 104 is communicatively coupled to the first main frame actuator 78 via the first valve assembly 110. The first valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the first main frame actuator 78/hydraulic cylinder (e.g., from a fluid source) and, in certain embodiments, from the first main frame actuator 78/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the first main frame actuator 78 includes a single hydraulic cylinder in the illustrated embodiment, in other embodiments, the first main frame actuator may include multiple hydraulic cylinders (e.g., 2, 3, 4, 5, 6, etc.). Furthermore, in certain embodiments, the first main frame actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

In the illustrated embodiment, the second main frame actuator 80 includes a hydraulic cylinder configured to control the position of the first wheel assembly. In addition, the frame control system 12, 88 includes a second valve assembly 112 configured to control a flow of fluid (e.g., hydraulic fluid) to the second main frame actuator 80/hydraulic cylinder. Accordingly, the controller 104 is communicatively coupled to the second main frame actuator 80 via the second valve assembly 112. The second valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the second main frame actuator 80/hydraulic cylinder (e.g., from a fluid source) and, in certain embodiments, from the second main frame actuator 80/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the second main frame actuator 80 includes a single hydraulic cylinder in the illustrated embodiment, in other embodiments, the second main frame actuator may include multiple hydraulic cylinders (e.g., 2, 3, 4, 5, 6, etc.). Furthermore, in certain embodiments, the second main frame actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

In the illustrated embodiment, the third main frame actuator 100 includes a hydraulic cylinder configured to control the position of the second wheel assembly. In addition, the frame control system 12, 88 includes a third valve assembly 114 configured to control a flow of fluid (e.g., hydraulic fluid) to the third main frame actuator 100/hydraulic cylinder. Accordingly, the controller 104 is communicatively coupled to the third main frame actuator 100 via the third valve assembly 114. The third valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the third main frame actuator 100/hydraulic cylinder (e.g., from a fluid source) and, in certain embodiments, from the third main frame actuator 100/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the third main frame actuator 100 includes a single hydraulic cylinder in the illustrated embodiment, in other embodiments, the third main frame actuator may include multiple hydraulic cylinders (e.g., 2, 3, 4, 5, 6, etc.). Furthermore, in certain embodiments, the third main frame actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

In the illustrated embodiment, the first sub-frame actuator 84 includes a hydraulic cylinder configured to control the position of a portion of the sub-frame relative to the main frame. In addition, the frame control system 12, 88 includes a fourth valve assembly 116 configured to control a flow of fluid (e.g., hydraulic fluid) to the first sub-frame actuator 84/hydraulic cylinder. Accordingly, the controller 104 is communicatively coupled to the first sub-frame actuator 84 via the fourth valve assembly 116. The fourth valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the first sub-frame actuator 84/hydraulic cylinder (e.g., from a fluid source) and, in certain embodiments, from the first sub-frame actuator 84/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the first sub-frame actuator 84 includes a single hydraulic cylinder in the illustrated embodiment, in other embodiments, the first sub-frame actuator may include multiple hydraulic cylinders (e.g., 2, 3, 4, 5, 6, etc.). Furthermore, in certain embodiments, the first sub-frame actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

In the illustrated embodiment, the second sub-frame actuator 86 includes a hydraulic cylinder configured to control the position of a portion of the sub-frame relative to the main frame. In addition, the frame control system 12, 88 includes a fifth valve assembly 118 configured to control a flow of fluid (e.g., hydraulic fluid) to the second sub-frame actuator 86/hydraulic cylinder. Accordingly, the controller 104 is communicatively coupled to the second sub-frame actuator 86 via the fifth valve assembly 118. The fifth valve assembly may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the second sub-frame actuator 86/hydraulic cylinder (e.g., from a fluid source) and, in certain embodiments, from the second sub-frame actuator 86/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the second sub-frame actuator 86 includes a single hydraulic cylinder in the illustrated embodiment, in other embodiments, the second sub-frame actuator may include multiple hydraulic cylinders (e.g., 2, 3, 4, 5, 6, etc.). Furthermore, in certain embodiments, the second sub-frame actuator may include any other suitable type(s) of actuator(s) (e.g., hydraulic motor(s), pneumatic cylinder(s), pneumatic motor(s), electromechanical actuator(s), linear actuator(s), screw drive(s), etc.). In embodiments in which the actuator(s) are controlled by fluid (e.g., air, hydraulic fluid, etc.), the actuator(s) may be communicatively coupled to the controller via an appropriate valve assembly.

As previously discussed, in certain embodiments, the controller 104 is configured to control the first and second sub-frame actuators to control the orientation of the sub-frame relative to the main frame. Furthermore, in certain embodiments, the controller 104 is configured to control the first sub-frame actuator to control the height of the sub-frame relative to the main frame. In addition, in certain embodiments, the controller 104 is configured to control the first and second main frame actuators to control the fore-aft orientation of the main frame. In certain embodiments, the controller 104 is configured to control the first main frame actuator to control the height of the main frame above the soil surface. Furthermore, in certain embodiments, the controller 104 is configured to control the first, second, and third main frame actuators to control the side-to-side orientation of the main frame.

In the illustrated embodiment, the frame control system 12, 88 includes a user interface 120 communicatively coupled to the controller 104. The user interface 120 may include any suitable control(s) configured to enable an operator to interact with (e.g., provide input to, etc.) the frame control system 12, 88, such as a keyboard, a mouse, one or more switches, one or more buttons, and one or more knobs. For example, the operator may input target height(s), threshold value(s), other suitable parameters, or a combination thereof, into the user interface. The user interface, in turn, may output signal(s) to the controller indicative of the input values. In the illustrated embodiment, the user interface includes a display 122 configured to present information to the operator. For example, the display 122 may present height(s) of the main frame/sub-frame, a difference between certain height(s), other suitable parameters, or a combination thereof. In addition, in certain embodiments, the display may include a touchscreen interface configured to enable an operator to provide input to the controller via the display.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A frame control system for an agricultural implement, comprising:
a first sensor configured to be positioned at a forward end portion of a sub-frame of the agricultural implement and directed toward a soil surface, wherein the sub-frame is configured to be positioned below a main frame of the agricultural implement, and the first sensor is configured to emit a first output signal toward the soil surface and to receive a first return signal indicative of a first height of the forward end portion of the sub-frame above the soil surface;

a second sensor configured to be positioned at a rearward end portion of the sub-frame and directed toward the soil surface, wherein the second sensor is configured to emit a second output signal toward the soil surface and to receive a second return signal indicative of a second height of the rearward end portion of the sub-frame above the soil surface;

a first sub-frame actuator configured to be coupled to the sub-frame and to the main frame, wherein the first sub-frame actuator is configured to control a first position of the forward end portion of the sub-frame relative to the main frame along a vertical axis;

a second sub-frame actuator configured to be coupled to the sub-frame and to the main frame, wherein the second sub-frame actuator is configured to control a second position of the rearward end portion of the sub-frame relative to the main frame along the vertical axis; and a controller comprising a memory and a processor, wherein the controller is communicatively coupled to the first sensor, to the first sub-frame actuator, to the second sensor, and to the second sub-frame actuator, and the controller is configured to control the first sub-frame actuator and the second sub-frame actuator such that a difference between the first height and a first target height is less than a threshold value, and a difference between the second height and a second target height is less than the threshold value.

2. The frame control system of claim 1, wherein the controller is configured to control the first and second sub-frame actuators such that a difference between the first height and the second height is less than a second threshold value.

3. The frame control system of claim 1, wherein the first target height is different than the second target height.

4. The frame control system of claim 1, wherein the first sensor comprises an infrared sensor, a radio detection and ranging sensor, a lidar sensor, an ultrasonic sensor, or a capacitive sensor.

5. An agricultural implement, comprising:
a main frame configured to support a first plurality of ground engaging tools;
a sub-frame movably coupled to the main frame, wherein the sub-frame is positioned below the main frame, and the sub-frame is configured to support a second plurality of ground engaging tools; and
a frame control system, comprising:
a first sensor positioned at a forward end portion of the sub-frame and directed toward a soil surface, wherein the first sensor is configured to emit a first output signal toward the soil surface and to receive a first return signal indicative of a first height of the forward end portion of the sub-frame above the soil surface;
a second sensor positioned at a rearward end portion of the sub-frame and directed toward the soil surface, wherein the second sensor is configured to emit a second output signal toward the soil surface and to receive a second return signal indicative of a second height of the rearward end portion of the sub-frame above the soil surface;
a first sub-frame actuator coupled to the sub-frame and to the main frame, wherein the first sub-frame actuator is configured to control a first position of the forward end portion of the sub-frame relative to the main frame along a vertical axis;
a second sub-frame actuator coupled to the sub-frame and to the main frame, wherein the second sub-frame actuator is configured to control a second position of the rearward end portion of the sub-frame relative to the main frame along the vertical axis; and
a controller comprising a memory and a processor, wherein the controller is communicatively coupled to the first sensor, to the first sub-frame actuator, to the second sensor, and to the second sub-frame actuator, and the controller is configured to control the first sub-frame actuator and the second sub-frame actuator such that a difference between the first height and a first target height is less than a threshold value, and a difference between the second height and a second target height is less than the threshold value.

6. The agricultural implement of claim 5, wherein the first sensor comprises an infrared sensor, a radio detection and ranging sensor, a lidar sensor, an ultrasonic sensor, or a capacitive sensor.

7. The agricultural implement of claim 5, wherein the controller is configured to control the first and second sub-frame actuators such that a difference between the first height and the second height is less than a second threshold value.

8. The agricultural implement of claim 5, wherein the first target height is different than the second target height.

9. A frame control system for an agricultural implement, comprising:
a first sensor configured to be positioned at a left end portion of a sub-frame of the agricultural implement and directed toward a soil surface, wherein the sub-frame is configured to be positioned below a main frame of the agricultural implement, and the first sensor is configured to emit a first output signal toward the soil surface and to receive a first return signal indicative of a first height of the left end portion of the sub-frame above the soil surface;

a second sensor configured to be positioned at a right end portion of the sub-frame and directed toward the soil surface, wherein the second sensor is configured to emit a second output signal toward the soil surface and to receive a second return signal indicative of a second height of the right end portion of the sub-frame above the soil surface;

a first sub-frame actuator configured to be coupled to the sub-frame and to the main frame, wherein the first sub-frame actuator is configured to control a first position of the left end portion of the sub-frame relative to the main frame along a vertical axis;

a second sub-frame actuator configured to be coupled to the sub-frame and to the main frame, wherein the second sub-frame actuator is configured to control a second position of the right end portion of the sub-frame relative to the main frame along the vertical axis; and a controller comprising a memory and a processor, wherein the controller is communicatively coupled to the first sensor, to the first sub-frame actuator, to the second sensor, and to the second sub-frame actuator, and the controller is configured to control the first sub-frame actuator and the second sub-frame actuator such that a difference between the first height and a first target height is less than a threshold value, and a difference between the second height and a second target height is less than the threshold value.

10. The frame control system of claim 9, wherein the controller is configured to control the first and second sub-frame actuators such that a difference between the first height and the second height is less than a second threshold value.

11. The frame control system of claim 9, wherein the first target height is different than the second target height.

12. The frame control system of claim 9, wherein the first sensor comprises an infrared sensor, a radio detection and ranging sensor, a lidar sensor, an ultrasonic sensor, or a capacitive sensor.

* * * * *